United States Patent
Finnerty

(10) Patent No.: US 7,476,461 B2
(45) Date of Patent: Jan. 13, 2009

(54) METHODS FOR THE ELECTROCHEMICAL OPTIMIZATION OF SOLID OXIDE FUEL CELL ELECTRODES

(75) Inventor: Caine Finnerty, Buffalo, NY (US)

(73) Assignee: NanoDynamics Energy, Inc., Buffalo, NY (US)

( * ) Notice: Subject to any disclaimer, the term of this patent is extended or adjusted under 35 U.S.C. 154(b) by 391 days.

(21) Appl. No.: 11/002,394

(22) Filed: Dec. 2, 2004

(65) Prior Publication Data

US 2005/0271931 A1 Dec. 8, 2005

Related U.S. Application Data

(60) Provisional application No. 60/526,380, filed on Dec. 2, 2003.

(51) Int. Cl.
*H01M 4/00* (2006.01)
*H01M 8/10* (2006.01)

(52) U.S. Cl. ................................ 429/44; 429/30
(58) Field of Classification Search ............ 429/44, 429/45; 427/115; 502/101
See application file for complete search history.

(56) References Cited

U.S. PATENT DOCUMENTS

| | | | |
|---|---|---|---|
| 4,851,303 A | 7/1989 | Madou et al. | |
| 4,883,497 A * | 11/1989 | Claar et al. | 29/623.5 |
| 5,108,850 A | 4/1992 | Carlson et al. | |
| 5,134,042 A | 7/1992 | Madou et al. | |
| 5,273,837 A | 12/1993 | Aitken et al. | |
| 5,474,800 A | 12/1995 | Matsuzaki | |
| 5,753,385 A | 5/1998 | Jankowski et al. | |
| 5,989,634 A | 11/1999 | Isenberg | |
| 5,993,989 A | 11/1999 | Baozhen et al. | |
| 6,007,683 A | 12/1999 | Jankowski et al. | |
| 6,207,311 B1 | 3/2001 | Baozhen et al. | |
| 6,228,521 B1 | 5/2001 | Kim et al. | |
| 6,428,920 B1 * | 8/2002 | Badding et al. | 429/30 |
| 6,548,424 B2 | 4/2003 | Putkonen | |
| 6,630,267 B2 | 10/2003 | Badding et al. | |
| 6,682,842 B1 * | 1/2004 | Visco et al. | 429/33 |
| 7,108,938 B2 * | 9/2006 | Ukai et al. | 429/40 |
| 2004/0072060 A1 | 4/2004 | Ukai et al. | |

* cited by examiner

*Primary Examiner*—Patrick Ryan
*Assistant Examiner*—Thomas H. Parsons
(74) *Attorney, Agent, or Firm*—K & L Gates LLP

(57) ABSTRACT

The present invention provides a solid oxide fuel cell which contains an anode, a cathode, and an electrolyte, where at least one of the electrode contains a wash-coat composition that improves the performance of the solid oxide fuel cell. Also provided is a method for making the solid oxide fuel cell.

18 Claims, 2 Drawing Sheets

METHODS FOR THE ELECTROCHEMICAL OPTIMIZATION OF SOLID OXIDE FUEL CELL ELECTRODES

CROSS REFERENCE TO RELATED APPLICATIONS

The present application claims priority to U.S. patent application Ser. No. 60/526,380, filed on Dec. 2, 2003.

FIELD OF THE INVENTION

The present invention relates generally to fuel cells, and particularly, to solid electrolyte type fuel cells, also known as solid oxide fuel cells (SOFCs).

BACKGROUND OF THE INVENTION

Increasing demand for convenient, reliable, and clean energy systems has drawn much attention to the development of fuel cells.

A fuel cell is an electrochemical device that produces electricity by controlling the flow of atoms and electrons during a reaction between a fuel and an oxidant to make use of the exchange of electrons associated with such reactions. The fuel is typically hydrogen, natural gas, coal gas, or other hydrocarbon-based fuel, and the oxidizer is typically air, oxygen, or other oxidizing composition.

A typical fuel cell generally contains a cathode, anode, electrolyte, and interconnect. The electricity-generating electrochemical reaction is carried out in a fuel cell in a controlled, stepwise manner. For example, the cathode causes oxygen to be reduced to oxygen ions. The solid electrolyte regulates the flow of molecules, acting as a barrier to all but oxygen ions. In addition, the anode catalytically extracts electrons from the fuel. And the interconnect transports the electrons from the anode to the cathode to complete the process and energy generated may be harnessed for various applications, such as powering an automobile.

Several families of fuel cells are known in the art. Although the basic components and function of each family is similar, the details of operation and the materials used in construction, however, are significantly varied. The present invention relates, generally, to fuel cells utilizing a solid electrolyte, i.e., SOFC.

A typical SOFC contains a solid, oxygen-ion conducting electrolyte separating a fuel electrode (anode) from an air electrode (cathode). During operation, electrons are released and the electrochemical potential (e.g., on the order of 1 volt for a single fuel cell) of the reaction draws the electrons through a circuit, preferably, an external circuit, where this electromotive force is utilized. Because the voltage/power output of a single fuel cell is relatively low, a typical unit targeted for commercial sale would include a plurality of fuel cells connected in series, parallel, or combinations thereof, through an electrical interconnect. This combination of fuel cells is known in the art as a stack.

Currently, zirconia is a generally the material of choice for the electrolyte. However, zirconia has a relatively low ionic conductivity, therefore it is often impregnated with yttria which introduces increased ionic conductivity (hereafter referred to as YSZ or yttria stabilized zirconia). The anode is typically made of a Ni/YSZ cermet and the cathode, a perovskite composition.

There are generally three types of SOFC: tubular, planar, and monolithic SOFC. Each of these fuel cells is similar in basic structure (anode, cathode, solid electrolyte, etc.), but differs substantially in geometry. Furthermore, each type of SOFC may further have a variety of different configurations. For example, a SOFC may be an electrolyte-supported type SOFC, where a dense electrolyte is used as supports and electrodes are applied on each side of the electrolyte (See, e.g., U.S. Pat. No. 5,273,837 to Aitken et at. and U.S. Pat. No. 6,428,920 to Bedding et al.). A SOFC may also be an air electrode-supported type SOFC, where the air electrode contains an inner porous impregnated-lanthanum manganite substrate subsequently coated with a gas-tight electrolyte layer, anode, and interconnect coatings (See, e.g., U.S. Pat. No. 5,108,850 to Carlson et at. and U.S. Pat. No. 5,989,634 to Isenberg). Additionally, a SOFC may be a fuel electrode-supported type SOFC, where the anode cermet acts as the support and the electrolyte layer underlying the air electrode is coated as a thin film (See, e.g., U.S. Pat. No. 5,998,056 to Divisek et al. and U.S. Pat. No. 6,228,521 to Kim et al.).

The output power of a SOFC is a function of the operating temperature, the area specific resistance (ASR) of the fuel cell, and the overall ionic conductivity of the electrolyte and the electrodes. The ASR and ionic conductivity are traditionally optimized by adjusting the starting compositions of the materials in the electrode and/or the electrolyte, and then further refined by adjustment of particle size and sintering conditions to give the desired morphology.

The area specific resistance (ASR) of the anode, for example, may be influenced by the Ni content of the electrode. For example, lower Ni content gives more stable electrode structures with better thermal expansion characteristics. However, to achieve good electrical conductivity and a low ASR, the Ni must form a coherent conducting "network" which generally requires a higher Ni content.

The ionic conductivity of the electrode also has, a major influence, on the power produced. The electrochemical reactions that drive the fuel cell are conventionally considered to occur at or around the three phase boundary (TPB), where the electrolyte meets the electrode and the electrode is in contact with the reactant gas. This area is generally considered to exist at the actual interface between the electrolyte and the electrode. If the ionic conductivity of the electrode could be substantially increased without detrimentally affecting the electrical properties, then substantial power increases may be obtained. This increased conduction of oxygen ions through the actual electrode may also reduce carbon deposition.

The operating temperature of the fuel cell may be controlled by limiting heat loss through the internal walls of the stack compartment and by transferring a fraction of the latent heat to the incoming fuel and air streams. During start-up, the stack may be heated via an external heat source such as electrical heating or via an internal heat source, such as combustion of a proportion of the available fuel. The ionic conductivity of the electrolyte is a function of temperature. Therefore, it is imperative that the desired operating temperature is reached as rapidly as the fuel cell and stack components will allow.

Operating temperature may be an important design parameter. High temperatures add complexity to the overall design, e.g., affecting the type of seals that may be employed. Operating temperature may also affect the efficiency of the fuel cell. SOFCs are generally operated at temperatures ranging from 800° C. to 1,100° C., which are required to overcome the high resistance of the electrolyte and polarization losses of the air electrode encountered at low temperatures. Recently developments that lead to lower temperature operation may be useful when the system operates on hydrogen, but are generally not practical when certain hydrocarbon based fuels are used as the fuel until more efficient low temperature reforming catalyst are developed.

One of the inherent advantages of the SOFC is its potential to operate on a variety of fuels, including hydrocarbon fuels. These fuels should either be reformed directly at the anode, or in-directly in a reforming unit within or near the stack. Reforming is traditionally accomplished at elevated temperatures, and thus integration within the stack produces a more efficient overall system design.

Direct reforming is preferred over in-direct or external reforming as benefits from coupling exothermic fuel cell reactions and endothermic reformer reactions increase efficiency and the integrated design greatly simplifies and reduces the size of the system. Unfortunately, the anode electrode known in the art is susceptible to carbon deposition when operating on hydrocarbon fuels.

SOFCs are being developed by numerous groups and hold great promise for commercial success due to their many potential benefits. Among these, the possibility of operating on a variety of fuels, efficient energy conversion, and low pollution are primary motivators. Multi-fuel capability is an important characteristic, considering that hydrogen is not widely available at present, nor is it expected to be easily accessible for many years.

However, successful commercialization demands a system that may be manufactured consistently, and that it is reliable, efficient, and requires simple or little maintenance. To date, several problems associated with SOFCs remain a barrier to its successful commercial use. For example, current art has not completely overcome efficiency losses due to poor ionic and electronic conductivity. Electrode structures which may produce ideal electrochemical characteristics are not always stable and may be susceptible to sintering. Whereas, electrodes that have a stable morphology often have a low surface area and may have a high ASR. Additionally, to develop a commercially viable SOFC, it is necessary to produce a fuel cell with consistent power density and stability in a variety of operating environments. To date, manufacturers have had a difficult time making reproducible fuel cells, sometimes scraping a majority of them due to poor performance. Issues that may arise include: inconsistent electrode thickness, non-homogenous mixing of materials, and non-uniform coatings, which contribute to variations in fuel cell performance. Temperature variants within the calcination furnace may also cause deviations in fuel cell power output. Several additional factors may affect the operating life of a SOFC, including carbon fouling and densification of the anode. Carbon fouling takes place when the fuel stream includes carbon (e.g., when a hydrocarbon fuel such as propane is used). Deposition may lead to loss of performance and eventually a catastrophic fuel cell failure. Furthermore, commercially available hydrocarbon fuels often contain other chemicals, such as sulfur, which may poison the fuel cell by blocking active sites. Densification, or sintering, may occur within the fuel cell during operation, and aggravates with increasing temperature. This is most significant on the anode side where a metal is generally incorporated into the design. In addition, for some applications, the time required to reach substantially full power output is a significant concern. For example, it is extremely important for the automotive industry, where "instant-on" is a strict requirement for commercial success. For SOFCs, the start up time is dictated by the rate of temperature increase, as the fuel cell output is controlled by the temperature of the fuel cell. Systems using battery and super capacitor support have been proposed, but the volume occupied by such a system that generates an equivalent power is prohibitive for the applications. It is therefore desirable to have processing technology and a fuel cell that increases both electrons and ionic conduction while increasing resistance to carbon formation and sulfur poisoning.

Several attempts have been made to-overcome the aforementioned problems, such as conductivity losses, and resistance to carbon formation and sulfur poisoning in SOFCs.

One approach to increase ionic conduction is through the use of non-zirconia based electrolytes. For example, U.S. Pat. Nos. 4,851,303 and 5,134,042 disclose a variety of non-zirconium solid electrolytes, having a polycrystal or single crystal structure, such as lanthanum strontium lithium fluoride, calcium uranium, $SrC_{12}KCl$, and others. The use of non-zirconia based electrolytes introduces significant challenges to the design of the integrated SOFC system and is not widely accepted, as witnessed by the relatively few efforts on non-zirconia systems, as compared to zirconia based electrolyte development. Thermal expansion matching of the electrodes and interconnect is one area that is complicated by the use on non-zirconia electrolytes. Furthermore, some non-zirconia electrolytes; such as some ceria-based electrolytes, exhibit electronic conduction in fuel atmospheres, resulting in excessive fuel consumption.

The use of a thin film YSZ electrolyte, such as that disclosed in U.S. Pat. Nos. 5,753,385 and 6,007,683, is another approach to reduce ionic losses. Vapor deposition techniques are employed to produce the thin films in both patents. U.S. Pat. No. 6,548,424 discusses an alternative process for production of thin film YSZ electrolytes, comprised of atomic layer deposition, wherein alternating vapor-phase pulses of constituent materials are fed into a reaction space and contacted with a substrate. While thin films are successful in reducing the resistance of the electrolyte by limiting the path length, the reliability of the fuel cell is compromised, as the structural integrity is significantly impaired. Gas leakage through the thin sections is another consideration, as it may result in degraded efficiency. In addition, manufacturing cost may be considerably higher with vapor deposition techniques, as compared to the powder processing approaches that are typically employed.

U.S. Pat. No. 5,993,989 discusses an interfacial layer of terbia-stabilized zirconia between the air electrode and the electrolyte that may be employed to reduces losses and operate over a wide range of temperatures. By incorporating the layer, some control of interaction between the air electrode and electrolyte and a reduction of polarization loss may be achieved. In U.S. Pat. No. 6,207,311, a Smaydia-stabilized zirconia electrolyte having high electrical conductivity is discussed, where the electrolyte material may be a very thin layer. Although the approaches discussed in the above patents may be used to reduce losses, the addition of an intermediate layer adds complexity, and therefore cost, to the manufacturing process. In addition, thin electrolytes are fragile and may result in an unreliable fuel cell.

Commercially viable manufacturing of SOFCs requires a process that is capable of producing a large quantity of fuel cells with consistent power density and stability in a variety of operating environments. Such a process is difficult to achieve with existing techniques. Furthermore, currently, once a fuel cell is sintered, very little if anything may be done with the fuel cell if its performance was not up to that of the others in the batch.

Accordingly, there remains a need in the art for a robust SOFC that may be manufactured in a reliable and consistent manner, and undergoes high efficiency operations and has an extended operational life. There also is a need in the art for a low cost process to produce such an SOFC, in such a way that it may be applied to a wide variety of electrolyte, anode, and cathode materials, and that is easy to, incorporate into existing manufacturing processes for a wide variety of SOFCs.

SUMMARY OF THE INVENTION

In one aspect of the present invention, a solid oxide fuel cell is provided that may operate efficiently.

In another aspect of the present invention, a solid oxide fuel cell is provided that may generate more power at a given temperature.

In another aspect of the present invention, a solid oxide fuel cell is provided that may operate efficiently at temperatures below 750° C.

In another aspect of the present invention, a solid oxide fuel cell is provided that may be manufactured in a reliable and consistent manner.

In another aspect of the present invention, a solid oxide fuel cell is provided that has an extended operational life.

In another aspect of the present invention, a solid oxide fuel cell is provided that is resistant to carbon deposition when operated on carbon-containing fuels.

In another aspect of the present invention a fuel cell is provided that may operate on a variety of fuels, including hydrogen, natural gas, liquid propane, and other traditional hydrocarbons.

In another aspect of the present invention, a low cost manufacturing process is provided to produce SOFCs in a reliable and consistent manner in such a way that it may be applied to a variety of configurations and anode, electrolyte, and cathode materials.

In another aspect of the present invention, a low cost manufacturing process is provided to produce SOFCs in a reliable, and consistent manner in such way that the process may be easily incorporated into existing manufacturing processes for a wide variety of SOFCs.

According to the present invention, these and other aspects are achieved by a SOFC that incorporates an amount of metal salts, such as salts of copper, iron, molybdenum, nickel, silver, or tungsten, or other catalytically active metals, dispersed or otherwise deposited within the pores of the electrode. These active metals produce a large specific surface area, and increase the active fuel cell area and catalytic activity. The resulting fuel cells have increased electronic and ionic conduction as well as an increased resistance to carbon formation and sulfur poisoning.

The addition of metals or compositions comprising metals (e.g., metal salts) in accordance with the present invention may also improve the performance of poorly performing fuel cells. For example, in the case of a poorly conducting nickel containing anode, the metal salt dispersions essentially complete the Ni conducting network by bridging gaps in continuity that may have occurred due to processing or sintering variations during production of the anode.

In one embodiment, the SOFC may be fabricated by adding catalytically active metals through a wash-coat procedure, which includes the steps of dissolving the metal salt or salts in a solution and exposing the fuel cell to the solution for a period of time sufficient to coat the fuel cell electrode to the desired degree. Upon subsequent heating, volatile fractions of the solution are vaporized and the active components may be deposited throughout the pores of the fuel cell, such as, in a uniform manner. This process generally creates a large surface area of deposited materials.

In another embodiment, a SOFC of the present invention may be produced by applying a solution containing at least one metal salt to the sintered fuel cell prior to reduction. For a tubular anode supported fuel cell, the solution may be applied so that the solution may be drawn into the fuel cell pores of the inner tube (the anode) via capillary action. Alternatively, the solution may be sprayed onto the surface. In another embodiment, the solution of mixed metal salts may be applied post reduction.

Additional aspects of the present invention will be apparent in view of the description that follows.

DETAILED DESCRIPTION OF THE INVENTION

As used herein and in the appended claims, the singular forms "a," "an," and "the" include plural references unless the content clearly dictates otherwise. Thus, for example, reference to "a metal salt" includes a plurality of such salts and equivalents thereof known to those skilled in the art, and reference to "the solvent" is a reference to one or more solvents and equivalents thereof known to those skilled in the art, and so forth. All publications, patent applications, patents, and other references mentioned herein are incorporated by reference in their entirety.

The present invention generally provides methods and compositions for improving the operating characteristics of an SOFC with the addition or incorporation of a wash-coat composition that includes a transitional metal or a salt thereof, such as a salt of molybdenum, iron, silver, cobalt, tungsten, or combinations thereof, at least onto a portion of the surface of or at least partially within one or more of the components of the SOFC. Although the present invention may be described by way of example in relation to a wash-coat procedure, it is understood that deposition or dispersion onto or within at least a portion of a SOFC component material may be accomplished in a variety of other ways and is therefore not limited thereto.

As the active components of the wash-coat composition are introduced, e.g., through a solution to a SOFC component, the active components become dispersed onto at least a portion of the surface of the component and in certain instances penetrates into at least a portion of the component, e.g., form small particles (such as, sub-micron particles) therein. This high dispersion and small particle size yields an increase in active fuel cell area and catalytic activity. In the case of a poorly conducting anode, the active components (e.g. a metal, a metal salt) dispersed onto or within the SOFC, essentially completing the metal (e.g., Ni) conducting network by filling in gaps in continuity that may have occurred due to processing or sintering variations. Besides improving the electrochemical performance of a fuel cell, the introduction of a wash-coat composition of the present invention in a fuel cell also reduces the amount of metal required in the cermet and consequently improves the fuel cell's stability and lowers the risk of shrinkage. For example, the inventor found that wash-coat composition of the present invention reduced the requirement of Ni in a fuel cell from about 50% to about 40% and the resulting fuel cell had better electronic and ionic conductivities.

Figure 1A:
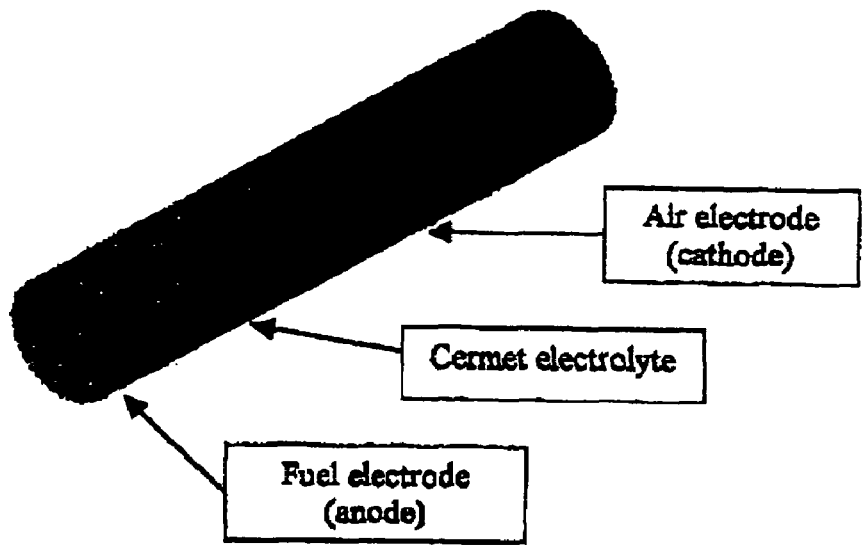
FIG. 1 illustrates a SOFC according to one embodiment of the present invention.
Figure 1B:
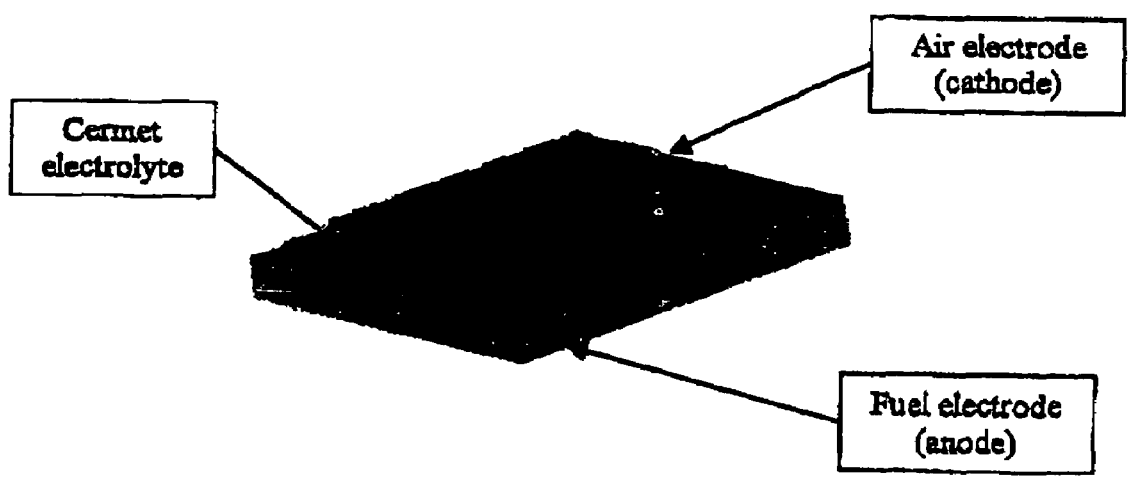
Figure 2:
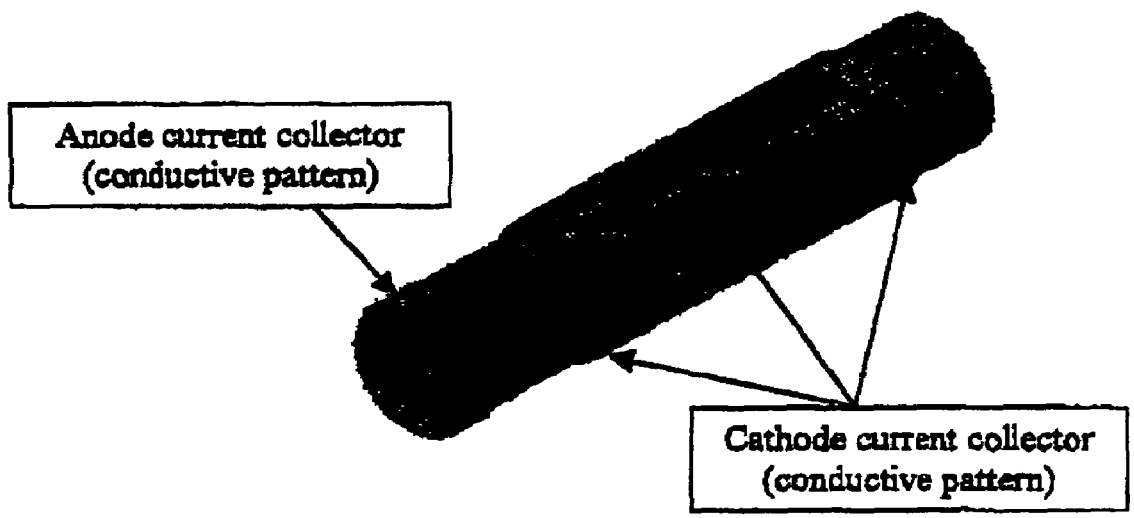
FIG. 2 shows a SOFC according to one embodiment of the present invention.

An improved SOFC fuel cell according to one embodiment of the present invention is illustrated in FIGS. 1 and 2, which includes an anode collector, anode, electrolyte, cathode, cathode collector, and an interconnect. An operational fuel cell system may be constructed by connecting a plurality of the unit fuel cells in series or parallel or combination thereof.

The influence or the degree to which the wash-coat composition, e.g., the metal salts, deposits or penetrates into the component material with a wash-coat solution is to an extent dependant on the oxidation state or other characteristics of an electrode or any other SOFC component, or more generally on the porosity of the component. For example, an anode reduced such that it has substantial porosity may allow for the wash-coat materials to be more easily dispersed onto or within the component material, whereas an oxidized anode structure that is less porous may inhibit migration through the electrode. Coating the anode before reduction may allow a calcination step to be incorporated after the wash-coat treatment, which may produce a more stable metal dopent interaction with the anode structure.

The solvent in which the salts are dissolved may also influence the effect of the wash-coat with faster evaporating solvents (e.g., organic solvents) giving higher overall dopent levels and generally increased effects.

The time that the solution is in contact with the electrode is considered the "soak time," which may also affect the overall effect of the wash-coat. A short soak time may result in the surface region of the electrode becoming doped with limited penetration into the body of the component. This may be useful when the wash-coat is tailored to increase electronic conductance and increase carbon resistance. However, if the soak time is prolonged, the wash-coat may penetrate further into the electrode, eventually reaching the TPB region. A wash-coat tailored to produce increased ionic conductivity may therefore be used to increase the effective ionic conduction of the entire electrode with a soak time sufficient to penetrate further into the body of the component, e.g., to improve ionic conductance of a component that produces power with electrochemical reactions that occur throughout the structure.

In one embodiment, the fuel cell is an anode supported fuel cell and the anode contains a porous material, such as a metal/ceramic composite, as also known as a cermet, with catalytically active metals dispersed throughout at least a portion of the cermet. The ceramic component may contain YSZ or other ceramic materials such as oxides of cerium. In a preferred embodiment, the stabilized-zirconia containing about 8% yttria and about 92% zirconia (mole/mole) may be employed.

The metal phase of the anode may contain a transition metal, alloys or physical mixtures thereof, including, without limitation, nickel, titanium, vanadium, ruthenium, rhodium, rhenium, palladium, magnesium, iron, and copper. In one embodiment, Ni and compounds/complexes thereof may be the preferred metal due to its high electronic conductivity under reducing atmosphere and its cost effectiveness.

When a Ni/YSZ cermet is used as the base material for an anode, the content of YSZ is preferably between about 10 to about 70% (v/v), or about 20 to about 70%, while the content of Ni is between about 30 to about 90% (v/v), or about 30 to about 80% (v/v). Generally, an anode cermet with a metal content greater than about 30% (v/v) may have desirable interfacial bonding among the metal particles, which results in an increased electronic conductivity. In order to enhance fuel cell performance, the porosity of the anode may be increased, so that concentration polarization (referring to voltage losses associated with resistance to gas flow through porous electrodes) may be kept at a relatively low level. In one embodiment, porosity may be created or increased by reducing metal oxide powders into metal under reducing conditions. Porosity may also be created or increased with the use of artificial pore formers (such as carbon powder, starch, and polymer beads) that are subsequently burned out during sintering. In one embodiment, about 50% (v/v) of pore-forming agents may be used in an electrode without scarifying its mechanical strength. In another embodiment, metal contents up to about 90% (v/v) in the cermet are found to be adequate to ensure high electronic conductivity while maintaining sufficient porosity to reduce concentration polarization.

The material suitable for making the electrolyte includes an ion conducting material, such as, a metal oxide ceramic (e.g., zirconia), or a stabilized metal oxide ceramic (e.g., YSZ). Yttria may be replaced by other stabilization materials, such as oxides based on cerium, calcium, and other stabilizers known in the art. Fully or partially stabilized metal oxide ceramics and/or their mixture may also be used. In one embodiment, stabilized-zirconia containing about 8% yttria and about 92% zirconia (mole/mole) is used. In another embodiment, doped-ceria, such as gadolinium-doped ceria ("CGO") is used $((Ce_{0.90}Gd_{0.10})O_{1.95})$.

The material suitable for making the cathode may also include perovskites, such as, $LaSrMnO_3$, $(LaSr)(CoFe)O_3$, $LaCaMnO_3$, and $(LaCa)(CoFe)O_3$. In one embodiment, a dual air electrode may be employed. The first electrode layer (i.e. closest layer to the electrolyte) contains a mixture of cathode material and ceramic electrolyte material (e.g., YSZ) and the second layer contains cathode material. The dual air electrode structure may provide better thermal expansion coefficient matching with the electrolyte and enhanced electrochemical properties.

The wash-coat or more generally the material dispersed onto or within the component of the SOFC as described herein may be employed to improve the properties (e.g., ionic conductivity) of an anode and/or a cathode. A wash-coat having all or a combination of the nitrate salts of Ce (about 5-30%, w/w), Cu (about 5-20%, w/w), Fe (about 5-10%, w/w), Mo (about 1-10%, w/w), and Ni (about 5-20%) is capable of increasing both the electrical and the ionic conductivity of the electrode. The relative loading content of each of the dopents may also affect the properties of the electrode. For example, increasing the relative content of Ni or Cu may improve electrical conductivity, while increasing the relative content of Ce and Mo may enhance ionic and electrical conductivity.

A wash-coat comprising of the salts of Ce (about 5-20%, w/w), Co (<about 15%, w/w), Mo (<about 10%, w/w), and W (about 1-20%, w/w) may improve both the reforming and electrical characteristics of the fuel cell. For example, fuel cells with such a wash-coat generally show an improved carbon reduction activity and an increase in power density when compared to those with a standard wash-coat. In another embodiment, a wash-coat comprising of Mo (<about 10%, w/w) and W (<about 10%, w/w) may considerably increase a fuel cell's carbon deposition resistance and sulfur tolerance while increasing power density during operation on hydrocarbon fuels. The ability of Mo and W to exist in a variety of oxidation states makes Mo and W very promising dopents because it improves the ionic and the electrical conductivity and enhances the resistance to sulfur toxicity. In another embodiment, a wash-coat comprising Mo (<about 10%, w/w), Cu (<about 15%, w/w), and Ce (about 5-20%, w/w) may significantly increase a fuel cell's carbon deposition resistance while increasing power density when operating on hydrocarbon fuels.

A wash-coat which is based on silver nitrate solutions (<about 30%, w/w) may substantially improve a fuel cell's performance. However, the wash-coat is generally more stable at <about 800° C. The addition of Mo and W, even a very small quantity, e.g., <about 2%, w/w, to the wash-coat in combination with an extend calcinations period at about 600° C. (e.g., about 4 hours) may enhance its stability while maintaining its advanced electrochemical performance.

In one embodiment, at least one interlayer thin film may be employed between the electrolyte and the electrode (e.g., the fuel electrode and/or the air electrode). Such layers may enhance the performance of a fuel cell, e.g. through the use of catalytic materials, or to prevent adverse chemical reactions during sintering.

The size of a fuel cell, e.g., a tubular-type fuel cell, may be dictated by a variety of factors, e.g., the desired power output. Individual fuel cell diameter may range from a fraction of a millimeter to tens or hundreds of millimeters and the length may range from tens to thousands of millimeters. The thickness of the fuel cell layers (e.g., anode, electrolyte, and cathode) may partially depend on factors, such as, the overall size of the fuel cell, which may range from several micrometers to several millimeters.

In one embodiment, the size of an individual fuel cell may range from about 1 to about 15 mm, or from about 3 to about 8 mm in diameter and from about 30 to about 250 mm, or from about 30 to about 150 mm in length. The thickness of the anode layer may range from about 150 to about 4,000 micrometers, or from about 500 to about 2,000 micrometers. The thickness of the electrolyte layer may range from about 1 to about 200 micrometers, or from about 5 to about 50 micrometers. The thickness of the cathode layer may range from about 20 to about 200 micrometers, or from about 30 to about 70 micrometers.

Except for the addition of the wash-coat or some other dispersion technique, a SOFC may be fabricated by conventional processes and techniques as are presently employed in the art. In one embodiment, fabrication of the SOFC may begin with the preparation of a fuel electrode mixture, containing metal and ceramic materials. Aqueous or non-aqueous media may be used to suspend the particulate materials. Aqueous media are often preferred because of their cost effectiveness and the environmental issues related to the flammability and toxicity of organic solvents. Common processing additives may be used to optimize subsequent processing steps.

Dispersing agents (dispersants) may be necessary to obtain a good, stable deagglomeration and dispersion of the constituent particles and fibers in the solvent, and to stabilize the suspension with a high solid : solvent ratio. Suitable dispersants are known in the art and are readily available commercially. For example, "KD2" (from ICI) was proven to be an effective dispersant for dispersing YSZ and NiO in acetone.

Binding agents (binders) may be added to the slurry in order to enhance the strength of the unsintered coating. A binder may form organic bridges, resulting in a strong adhesion after evaporation of solvent. Polyvinyl alcohol (PVA) and polyvinyl butyral (PVB) are examples of suited binders for water-based slurries and organic media-based slurries, respectively.

Plasticizing agents (plasticizers) may be added to the slurry to reduce the glass transition of the binder and for ease of handling and storage. Common plasticizers for PVA include polyethylene glycol and glycerol. Common plasticizers for PVB include dibutyl phthalate and polyethylene glycol.

In addition, other optional additives, such as homogenizers and anti-foaming agents, may be added if necessary.

These materials are often employed to ensure a well-dispersed, homogeneous and stable mixture and are incorporated in the mixture containing the cermet and the fibrous material. The characteristics of these mixtures, such as viscosity, may be altered by changing the properties and/or the amounts of the raw materials used. The molding procedure may also be determined by other factors, such as, the type of fuel cell desired. For example, extrusion of plastic masses may be used to manufacture tubular shaped fuel cells with, e.g., both ends opened or one end closed. In another embodiment, planar shaped fuel cells may be molded using casting techniques (liquid processing) or pressing techniques (dry processing). Casting techniques generally include, without limitation, slip-casting, centrifugal casting, gel-casting, tape casting, and the like. Pressing techniques generally include, without limitation, dry pressing and isostatic pressing. These processing methods are well known in the art.

In one embodiment, the ceramic and metal oxide powder/fiber mixture is dispersed in a solvent by milling and mixing, which may break down the naturally occurring agglomerates in the starting materials and promotes the adsorption of dispersant. Procedures for milling ceramic and metal oxide powder/fiber mixture are known in the art, such as, ball-milling. More aggressive milling techniques (such as vibratory milling), which may require the use of grinding media (e.g., stabilized zirconia beads), may be employed when needed to ensure a more effective de-agglomeration of the powders.

Metal may be initially introduced in the anode in elemental form or precursor form, such as, a metal powder, a metal oxide powder, a metal compound/complex (aqueous or non-aqueous). Metal oxide powders, such as NiO, are often employed because of their cost effectiveness and their adaptability to ceramic processing. Metal oxide (e.g., NiO) may be converted to elemental metal (e.g., Ni) through further processing or in the reducing environment of an operating fuel cell.

Prior or subsequent to the sintering step, an aqueous or non-aqueous electrolyte slurry may be applied onto the sintered or unsintered electrode (e.g., anode) support (tubular or planar). The electrode support may be partially sintered prior to electrolyte coating. A variety of slurry coating techniques may be used, including, without limitation, spraying techniques, dip-coating techniques, screen printing techniques, pad printing techniques, painting techniques, and transferring techniques. The type of coating technique used may depend on a variety of factors, such as, the shape of the anode substrate and the thickness of the coated layer. A thin, uniform and well-bonded structure may be required to ensure better performance and prevent resistance losses. The coated fuel cell electrode may be sintered at relatively high temperatures (e.g., about 1000-1600° C.), depending on, e.g., the constituent materials and their morphology, in order to achieve full densification. This procedure may be performed in an oxidizing atmosphere.

If a dual air electrode is employed, an air electrode slurry containing a mixture of cathode material and ceramic electrolyte material may then be applied onto the gas-tight cermet electrolyte, such as, by using conventional slurry coating processes. A second air electrode containing a cathode material may then be applied.

In one embodiment, after the anode, electrolyte and cathode layers have been sintered, current collectors may be applied to complete the fuel cell manufacture. In the case where tubular design is used, anode current collection may generally rely on using metallic inserts, which transfer electrons from the anode, such as, through multiple physical contact points. However, the main disadvantage of this technique evolved around maintaining good physical contact between the metal inserts and the anode coating, under reducing atmosphere and over extended periods of time. Generally, physical contact is depleted over time, due to instability of the metallic inserts during operating conditions. An alternative is the use of a highly conductive metal-rich anode support allows for conductive ink or paste to be applied directly onto the fuel electrode, without the use of any physical inserts into the tube. Preferably, the conductive inks or pastes contain silver, and such compounds are often used for this effect. This in turn is favorable to the electrochemical performance of the fuel cell, since fuel feeding is not hindered by physical obstacles, and fuel is distributed more uniformly to the anode reaction sites.

EXAMPLES

The following examples illustrate the present invention, which are set forth to aid in the understanding of the invention, and should not be construed to limit in any way the scope of the invention as defined in the claims which follow thereafter.

The inventor data indicate that a pre-reduced and tested fuel cell when treated with the wash-coat composition of the present invention may have generally a 30-50% increase in power output, compared to that of a control fuel cell. The wash-coat composition of the present invention often has a greater influence on otherwise poorer performing fuel cells, increasing its power output by as much as a 10-fold. Sequential applications of the wash-coat also may produce additional power gains, although these are smaller in magnitude.

While the foregoing invention has been described in some detail for purposes of clarity and understanding, it will be appreciated by one skilled in the art, from a reading of the disclosure, that various changes in form and detail may be made without departing from the true scope of the invention in the appended claims.

What is claimed is:

1. A solid oxide fuel cell comprising an anode, a cathode, and an electrolyte, wherein at least one of the anode and the cathode comprises a porous material and a wash-coat composition comprising a metal selected from the group consisting of cerium, copper, molybdenum, and tungsten, and wherein the wash-coat composition is dispersed onto at least a portion of a surface of the at least one of the anode and the cathode and into at least a portion of the pores therein.

2. The solid oxide fuel cell of claim 1, wherein the wash-coat composition comprises molybdenum and tungsten.

3. The solid oxide fuel cell of claim 2, wherein the wash-coat composition comprises:
   a concentration of molybdenum of less than about 10%, w/w; and
   a concentration of tungsten of less than about 10%, w/w.

4. The solid oxide fuel cell of claim 1, wherein the wash-coat composition comprises:
   molybdenum;
   copper; and
   cerium.

5. The solid oxide fuel cell of claim 4, wherein the wash-coat composition comprises:
   a concentration of molybdenum of less than about 10%, w/w;
   a concentration of copper of less than about 15%, w/w; and
   a concentration of cerium from about 5%, w/w to about 20%, w/w.

6. The solid oxide fuel cell of claim 1 wherein the wash-coat composition comprises:
   molybdenum;
   tungsten; and
   silver nitrate.

7. The solid oxide fuel cell of claim 6, wherein the wash-coat composition comprises a concentration of silver nitrate of less than about 30%, w/w.

8. The solid oxide fuel cell of claim 7, wherein the wash-coat composition comprises:
   a concentration of cerium nitrate of less than about 15%, w/w; and
   a concentration of cobalt of less than about 10%, w/w.

9. The solid oxide fUel cell of claim 6, wherein the wash-coat composition comprises:
   a concentration of tungsten of about 2%, w/w; and
   a concentration of molybdenum of about 2%, w/w.

10. The solid oxide fuel cell of claim 1, wherein the wash-coat composition comprises:
    a nitrate salt of cerium; and
    a salt of molybdenum.

11. The solid oxide fuel cell of claim 10, wherein the wash-coat composition comprises:
    a concentration of a nitrate salt of cerium of about 5%, w/w to about 30%, w/w; and
    a concentration of a salt of molybdenum of about 1%, w/w to about 10%, w/w.

12. The solid oxide fuel cell of claim 10, wherein the wash-coat composition further comprises:
    a nitrate salt of copper;
    a nitrate salt of iron; and
    a nitrate salt of nickel.

13. The solid oxide fuel cell of claim 12, wherein the wash-coat composition comprises:
    a concentration of a nitrate salt of copper of about 5%, w/w to about 20%, w/w;
    a concentration of a nitrate salt of iron of about 5%, w/w to about 10%, w/w; and
    a concentration of a nitrate salt of nickel of about 5%, w/w to about 20%, w/w.

14. The solid oxide fuel cell of claim 1, wherein the wash-coat composition comprises:
    a salt of cerium;
    a salt of cobalt;
    a salt of molybdenum; and
    a salt of tungsten.

15. The solid oxide fuel cell of claim 14, wherein the wash-coat composition comprises:
    a concentration of a salt of cerium from about 5%, w/w to about 20%, w/w;
    a concentration of a salt of cobalt of less than about 15%, w/w;
    a concentration of a salt of molybdenum of less than about 10%, w/w; and
    a concentration of a salt of tungsten from about 1%, w/w to about 20%, w/w.

16. The solid oxide fuel cell of claim 1, wherein the wash-coat composition comprises:
    a concentration of a salt of molybdenum of about 1%, w/w to about 5%, w/w;
    a concentration of a nitrate salt of copper of about 5%, w/w to about 20%, w/w;
    a concentration of a nitrate salt of cerium of about 5%, w/w to about 10%, w/w; and
    a concentration of a nitrate salt of nickel of about 5%, w/w to about 20%, w/w.

17. A solid oxide fuel cell comprising an anode, a cathode, and an electrolyte, wherein at least one of the anode and the cathode comprises a porous material and a wash-coat composition dispersed onto at least a portion of a surface of the at least one of the anode and the cathode and into at least a portion of the pores therein, wherein the wash-coat composition comprises a salt of molybdenum in a concentration from about 1%, w/w to about 10%, w/w.

18. A solid oxide fuel cell comprising an anode, a cathode, and an electrolyte, wherein at least one of the anode and the cathode comprises a porous material and a wash-coat composition dispersed onto at least a portion of a surface of the at least one of the anode and the cathode and into at least a portion of the pores therein, wherein the wash-coat composition comprises a salt of cerium in a concentration from about 5%, w/w to about 30%, w/w.

* * * * *